US012699065B2

(12) United States Patent
Robertson et al.

(10) Patent No.: US 12,699,065 B2
(45) Date of Patent: Aug. 4, 2026

(54) CONDUCTIVITY SENSOR

(71) Applicant: Georg Fischer Signet LLC, El Monte, CA (US)

(72) Inventors: David Eugene Robertson, Glendora, CA (US); Kevin Michael Franks, Fairfield Rd, VT (US)

(73) Assignee: Georg Fischer Signet LLC, Irwindale, CA (US)

( * ) Notice: Subject to any disclaimer, the term of this patent is extended or adjusted under 35 U.S.C. 154(b) by 224 days.

(21) Appl. No.: 18/242,634

(22) Filed: Sep. 6, 2023

(65) Prior Publication Data

US 2025/0076235 A1 Mar. 6, 2025

(51) Int. Cl.
*G01N 27/08* (2006.01)

(52) U.S. Cl.
CPC .................................... *G01N 27/08* (2013.01)

(58) Field of Classification Search
CPC ......... G01R 27/22; G01N 27/07; G01N 27/08
See application file for complete search history.

(56) References Cited

U.S. PATENT DOCUMENTS

| | | | |
|---|---|---|---|
| 7,189,314 B1 * | 3/2007 | Pace ................... | G01N 33/1886 |
| | | | 204/412 |
| 8,766,655 B2 | 7/2014 | Thieme et al. | |

| | | | |
|---|---|---|---|
| 9,000,784 B2 | 4/2015 | Eberheim et al. | |
| 2010/0230283 A1 | 9/2010 | Fanselow et al. | |
| 2013/0021047 A1 * | 1/2013 | Thieme ................... | G01N 27/07 |
| | | | 324/724 |
| 2018/0275092 A1 | 9/2018 | Fanselow et al. | |
| 2019/0187084 A1 * | 6/2019 | Ichinari ................ | G01N 27/06 |
| 2022/0074781 A1 * | 3/2022 | Pankov ................. | G01F 23/268 |
| 2023/0152408 A1 * | 5/2023 | Nagel .................... | G01R 27/22 |
| | | | 324/546 |

FOREIGN PATENT DOCUMENTS

| | | | | |
|---|---|---|---|---|
| CN | 2909250 Y | 6/2007 | | |
| CN | 109738488 A | 5/2019 | | |
| GB | 2444552 A | * 6/2008 | .......... | G01F 23/242 |
| KR | 20230044932 A | * 4/2023 | .......... | C25B 15/033 |

* cited by examiner

*Primary Examiner* — Judy Nguyen
*Assistant Examiner* — Adam S Clarke
(74) *Attorney, Agent, or Firm* — Harness, Dickey & Pierce, P.L.C.

(57) ABSTRACT

A conductivity sensor is provided having an elongated non-conductive body. First and second electrodes extend from the body and are vertically separated from each other. Preferably, the body has a slot therein running partially away from the bottom of the body and being open in a radially outwardly direction. An upper portion of the slot defines a downwardly facing ledge. The first electrode extends through an upper portion of the body and terminates at a lower edge of the body. The second electrode, shorter than the first electrode, extends through an upper portion of the body and terminates at the ledge.

7 Claims, 3 Drawing Sheets

CONDUCTIVITY SENSOR

FIELD

The present disclosure relates to devices for measuring the conductivity of liquids and, more particularly, to conductivity sensors for sensing the conductivity of water quality.

BACKGROUND

This section provides background information related to the present disclosure which is not necessarily prior art.

Contact conductivity sensors are ideally suited for measuring resistivity/conductivity of liquids ranging from pure and ultrapure water to sea water, rinse water and chemical solutions. Conductivity sensors generally rely on an electrodes that are carefully sized and positioned to enhance conductivity sensor accuracy. Some conductivity sensor embodiments utilize internally positioned electrodes to achieve the necessary sensor performance, which can contribute to electrode fouling that can severely affect electrode performance and, therefore, conductivity sensor accuracy. Because of these concerns, it is important that the conductivity sensor be easily cleaned which, because of the design of conventional conductivity sensors, typically requires removal of sensor from the sensing environment for cleaning and active scrubbing and internal electrodes are difficult to access and can be easily damaged. Instead, conventional conductivity sensors require frequent manual maintenance to ensure the sensor is clean and reading accurately.

The electrodes may be entirely arranged in the housing and a hole is arranged on the housing to let the fluid flowing into the housing to contact the electrodes.

Accordingly, there is a need in the art for a conductivity sensor that can be cleaned by the fluid flow and externally mounted electrodes can be easily accessed for inspection and cleaning.

SUMMARY

This section provides a general summary of the disclosure, and is not a comprehensive disclosure of its full scope or all of its features.

In accordance with the teachings of the present invention a conductivity sensor is provided having an elongated non-conductive body. First and second electrodes extend from the body and are vertically separated from each other.

In a preferred embodiment of this invention a conductivity sensor has an elongated non-conductive cylindrical. The body has a slot running partially upwardly from the bottom of the body and is open radially outwardly. An upper portion of the slot defines a ledge or step or shelf. A first electrode extends through an upper portion of the body and terminates at a lower edge of the body. A second electrode, shorter than the first electrode extends through an upper portion of the body and terminates at the ledge. For example, when the conductivity sensor is mounted vertically, the second electrode is vertically offset from the first electrode.

Accordingly, the electrodes are directly exposed to the fluid. The distance between the two electrodes as well as the size of the button end of the electrodes defines the cell constant of the sensor.

This design has the advantage that the cleaning of electrode is much easier, because they are arranged at the outside of the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figures 1, 2, 3:
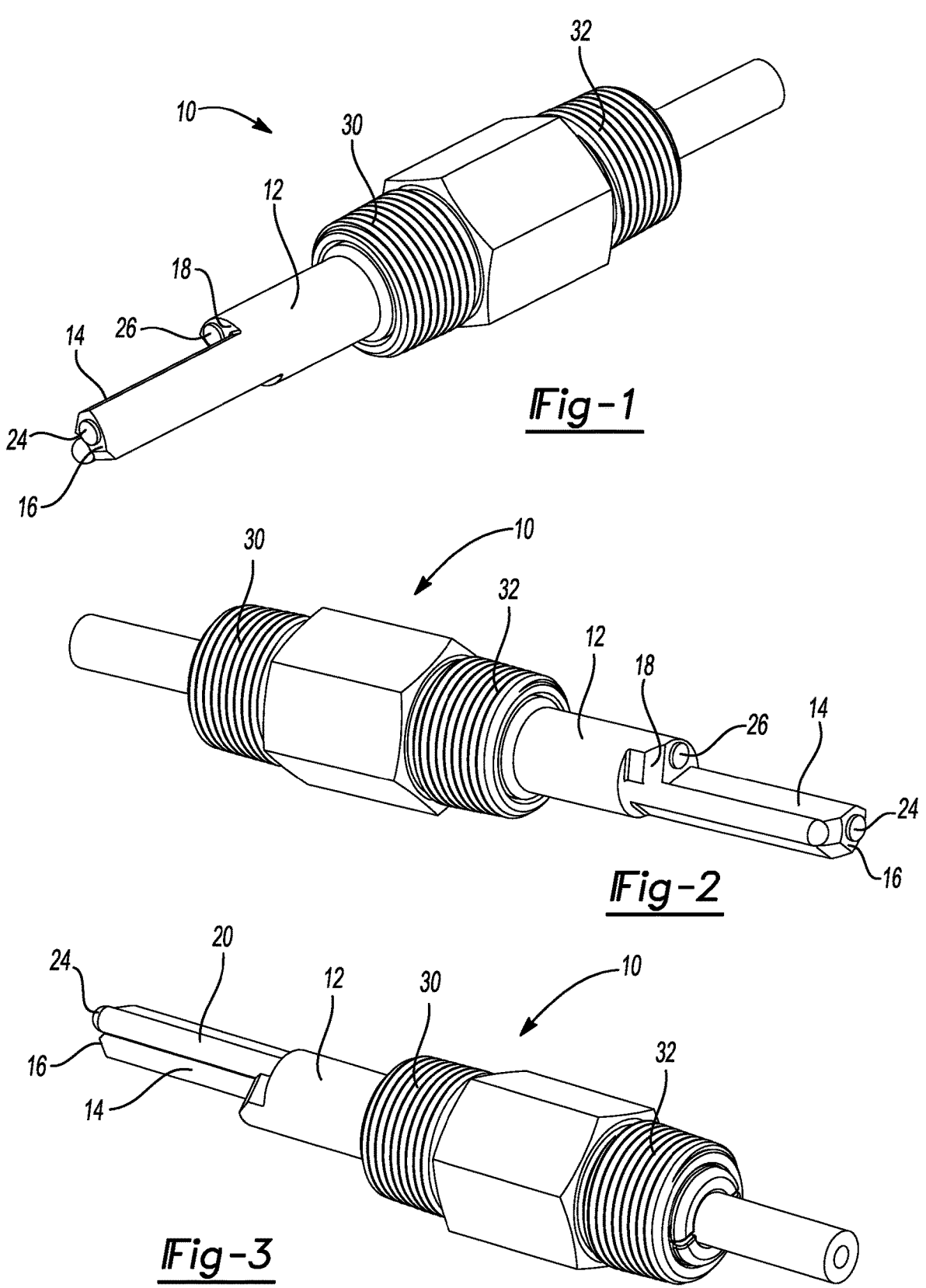
FIG. 1 is a perspective view of a conductivity sensor made in accordance with the teachings of this invention.
FIG. 2 is another perspective view taken from another angle of the conductivity sensor.
FIG. 3 is another perspective view of the conductivity sensor taken from still another angle.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Turning now to the drawings, beginning with FIGS. 1-3, the conductivity sensor 10 according to the preferred embodiment has an elongated non-conductive cylindrical body 12. Body 12 is preferably made of a chlorinated polyvinyl chloride (CVPC) pipe. The body is essentially solid except for a cutaway or slot 14 running partially upward from a bottom 16 of the body 12. The slot 14 is open a radially outwardly direction An upper portion of the slot 14 defines a downwardly facing step or ledge 18.

A first electrode 20 extends through an upper portion of the body 12 and terminates at a lower edge or bottom 16 of the body 12.

A second electrode 22 is shorter than the first electrode 20. The second electrode 22 extends through an upper portion of the body 12 and terminates at the ledge 18.

The first electrode 20 and second electrode 22 are made of conductive material, preferably, a stainless steel or titanium Grade 2 alloy. The first electrode 20 and second electrode 22 are both press fit into the body 12.

An electrically conductive button 24 is formed on the lower end of the first electrode 20 and extends from the bottom 16 of the body 12. Similarly, an electrically conductive button 26 is formed on a lower end of the second electrode 22 and extends from the bottom of the ledge 18. Both of the buttons 24 and 26 have heads that are larger in diameter than the diameters of their respective electrodes to which they are connected.

Figure 4:
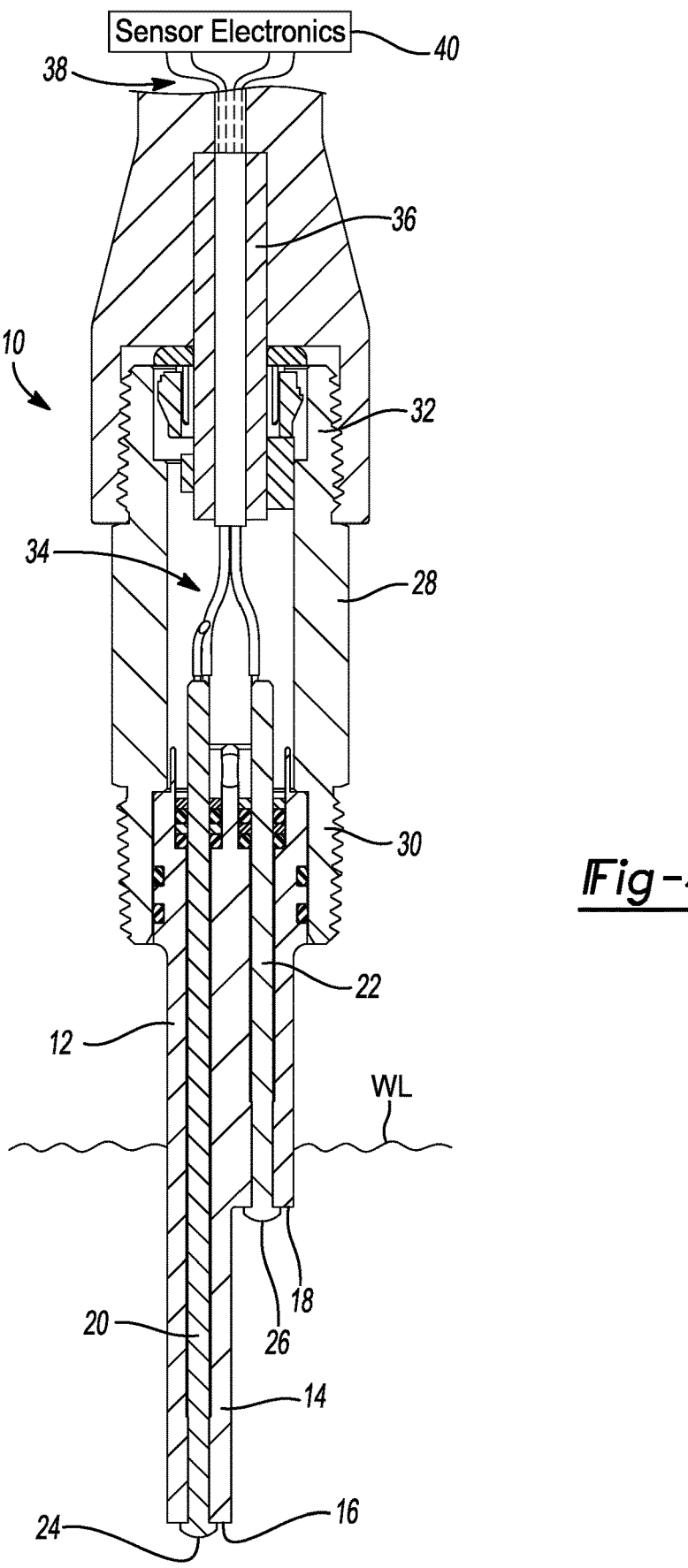
FIG. 4 is a longitudinal cross-sectional view of the conductivity sensor.
Figure 5:
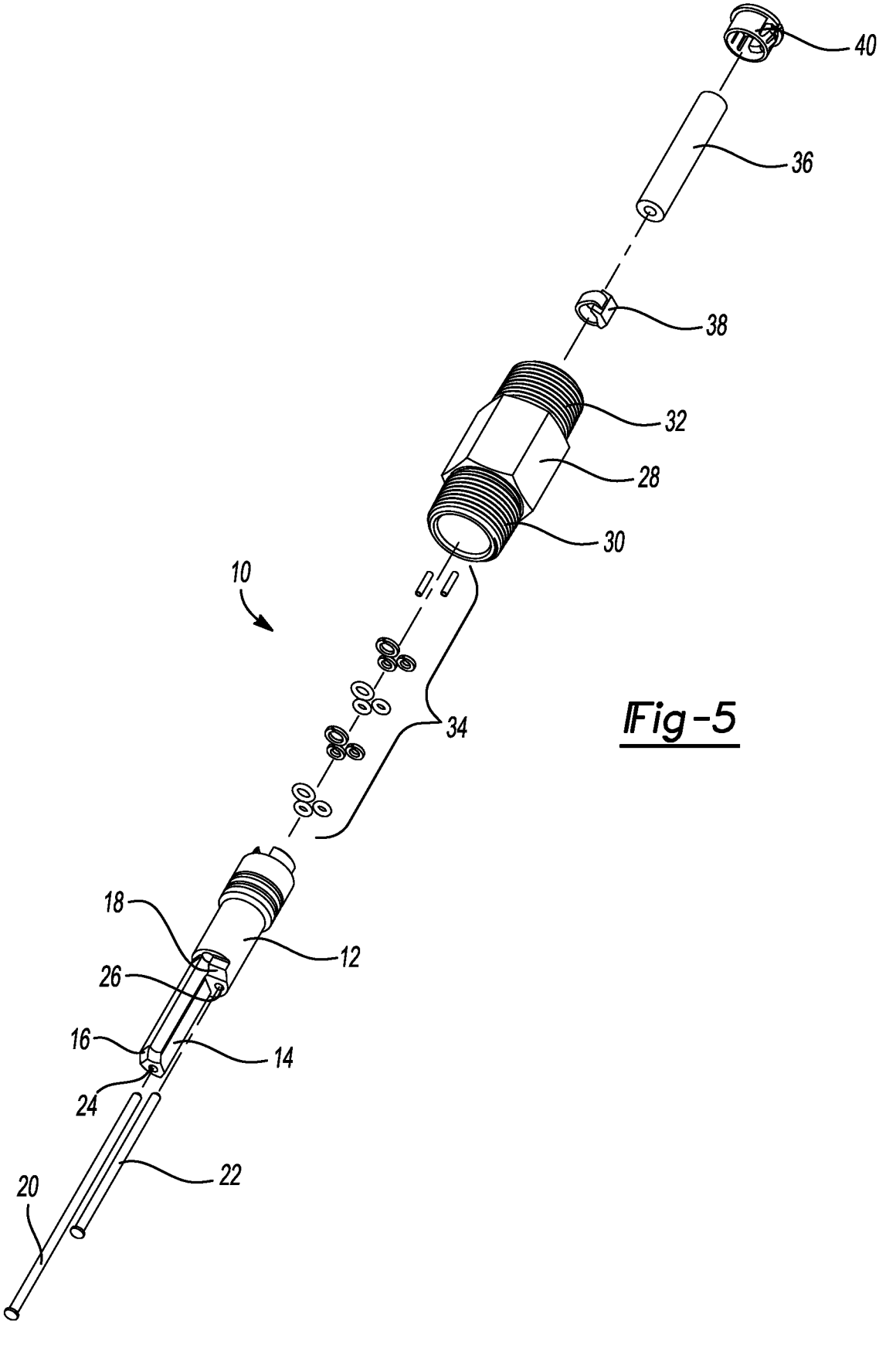
FIG. 5 is an exploded perspective view of the conductivity sensor.

A plastic or metallic fitting or cap 28 has its lower portion connected to and sealed to an outer circumference of the upper portion of body 12 Cap 28 includes a pair of external threads 30 and 32. Thread 30 provides a means to attach the conductivity sensor 10 to a piping system at the test site. Thread 32 is typically attached to a pipe that allows the end user to route the wires 38 from the electrodes 20, 22 to sensor electronics 40 for taking the measurement (see FIG. 4). Rubber tube 36 is used to support the wires 38 and serves to provide wire strain relief.

In operation, the conductivity sensor 10 is placed into the liquid to be measured below the waterline WL. Conductivity sensor 10 is ideally suited for measuring resistivity/conductivity of liquids ranging from pure and ultrapure water to sea water, rinse water and chemical solutions, it is important that the conductivity sensor 10 be easily cleaned. In contrast to the design of conventional conductivity sensors which typically requires removal of sensor from the sensing environment for cleaning, the electrodes 20, 22 of the conductivity sensor 10 are exposed and easily cleaned.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A conductivity sensor comprising:
an elongated non-conductive cylindrical body having a major axis, with an upper portion and a bottom;
first and second elongated electrodes extending parallel to the axis, the first electrode being longer than the second electrode;
ends of the first and second electrodes being separated by different distances from the bottom of the body;
the body having a slot therein running partially upwardly from the bottom of the body and being open in a radially outwardly direction;
an upper portion of the slot defining a downwardly facing ledge;
the first electrode extending through an upper portion of the body and having a lower portion terminating at the bottom of the body, and
the second electrode extending through an upper portion of the body and having a lower portion terminating at the ledge.

2. The conductivity sensor of claim 1 further comprising:
a first electrically conductive button connected to the first electrode and extending from the bottom of the body; and
a second electrically conductive button connected to the second electrode and extending from the bottom of the ledge.

3. The conductivity sensor of claim 2 wherein the buttons have a diameter larger than their respective electrodes.

4. The conductivity sensor of claim 3 wherein the buttons are integrally formed with the electrodes.

5. The conductivity sensor of claim 1 wherein the first and second electrodes are stainless steel or a titanium alloy.

6. The conductivity sensor of claim 1 wherein of the body is chlorinated polyvinyl chloride (CVPC) pipe.

7. The conductivity sensor of claim 1 which further comprises:
a cap threaded to an upper portion of the body, the cap having external threads at its upper portion configured to be connected to an external piping system at a test site.

* * * * *